United States Patent
Moon

(10) Patent No.: US 6,984,968 B2
(45) Date of Patent: Jan. 10, 2006

(54) SWITCHING POWER SUPPLY APPARATUS FOR OUTPUTTING VARIABLE VOLTAGE

(75) Inventor: Beyoung-min Moon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 185 days.

(21) Appl. No.: 10/715,131

(22) Filed: Nov. 18, 2003

(65) Prior Publication Data
US 2004/0174151 A1    Sep. 9, 2004

(30) Foreign Application Priority Data
Nov. 18, 2002  (KR)  ............. 10-2002-0071669

(51) Int. Cl.
G05F 1/40    (2006.01)
(52) U.S. Cl. .................................... 323/282
(58) Field of Classification Search ............ 323/282, 323/283, 284, 288, 289, 351
See application file for complete search history.

(56) References Cited

U.S. PATENT DOCUMENTS 4,580,089 A  *  4/1986  Grunsch et al. ............ 323/287
5,003,454 A  *  3/1991  Bruning ....................... 363/81

* cited by examiner

Primary Examiner—Adolf Berhane
(74) Attorney, Agent, or Firm—Sughrue Mion, PLLC

(57) ABSTRACT

A switching power supply apparatus that includes a pulse generating unit that sets a frequency of a pulse width modulation signal using capacitance applied to a capacitance input terminal, a switching unit that intermittently connects an input voltage, applied from outside the switching power supply, in response to the pulse width modulation signal, an output unit that smoothes the intermittent voltage from the switching unit, and outputs the same, and a capacitance varying unit that varies the capacitance applied to the pulse generating unit in response to a controlling signal. The switching power supply apparatus stabilizes operation of the electronic apparatus by controlling the current increase supplied to the electronic apparatus by receiving in advance the controlling signal for detecting a load increase before the load of the electronic apparatus actually increases.

28 Claims, 4 Drawing Sheets

SWITCHING POWER SUPPLY APPARATUS FOR OUTPUTTING VARIABLE VOLTAGE

CROSS-REFERENCE TO RELATED APPLICATIONS

This application claims the benefit of Korean Patent Application No. 2002-71669, filed Nov. 18, 2002 in the Korean Intellectual Property Office, the disclosure of which is incorporated herein by reference.

BACKGROUND OF THE INVENTION

1. Field of the Invention

The present invention relates to a switching power supply apparatus and more particularly to a switching power supply apparatus for varying output voltage in response to change of power dissipation of an electronic apparatus operated by the switching power supply apparatus.

2. Description of the Related Art

In general, a power supply apparatus for outputting direct current rectifies alternating current from the outside, and supplies one single primary voltage required by an electronic apparatus. In cases where the electronic apparatus requires a secondary voltage different from the primary voltage, the power supply drops or raises the primary voltage as needed. Examples of methods used for converting the primary voltage applied to the electronic apparatus into the secondary voltage include a linear converting method and a switching converting method.

The linear converting method is a method for forming the secondary voltage by mainly dividing the primary voltage by means of a passive element such as a resistor. However, since the passive element generates heat according to the voltage drop, it causes a 50% power loss as well as showing low stability.

The switching converting method obtains direct current by turning on and off the primary voltage and outputting the same in the form of a pulse, and by smoothing the pulse. This reduces the weak points of the linear converting method, namely, high power loss and heat generation. The switching conversion has more than 90% power efficiency and generates little heat.

FIG. 1 is a conceptual block diagram of a switching power supply apparatus of a related art. The switching power supply apparatus includes a pulse generating unit 10, a switch 20, an output unit 30.

The pulse generating unit 10 sets a duty ratio by capacitance of the capacitor 11 connected with a capacitance input terminal $C_T$, and outputs a PWM (Pulse Width Modulation) signal according to the set duty ratio. The switch 20 performs turn on and turn off operations between an input voltage Vin and the output unit 30 in response to the pulse width modulation signal output from the pulse generating unit 10.

The output unit 30 smoothes the input voltage Vin that is in a form of a pulse defined by operation of the switch 20, and outputs the same. The procedure for smoothing the pulse form input voltage is described in more detail below.

If the pulse width modulation signal Vsw from the pulse generating unit 10 is 'high,' a gate terminal of the switch 20 consisting of an NMOS (N-channel Metal Oxide Semiconductor) transistor is turned on so that the input voltage Vin is applied to the output terminal Vout through an inductor 31. At this moment, a diode 32 is reverse-biased, remaining at a blocked off status.

In contrast, if the pulse width modulation signal output from the pulse generating unit 10 is 'low', the switch 20 is turned off, and the input voltage Vin supplied to the inductor 31 is blocked off, whereby reverse electromotive force is generated instantly at the inductor 31. Accordingly, the diode 32 is turned on by the reverse electromotive force generated from the inductor 31, and a current path formed by the inductor 31, the capacitor 33, and the diode 32 discharges accumulated current.

By the foregoing procedure, namely, the procedure where turn-on and turn-off of the switch 20 are repeated, a voltage given by the following formula 1 is applied to the output terminal Vout of the switching power supply apparatus.

$$Vout = \frac{t_{on}}{(t_{on} + t_{off})} Vin \quad \text{[Formula 1]}$$

Here, $t_{on}$ equals a time period during which the switch 20 is turned on, and $t_{off}$ equals a time period during which the switch 20 is turned off. The time periods $t_{on}$, $t_{off}$ for determining an output voltage of the output terminal Vout, are determined by the capacity of the capacitor 11 connected with the capacitance input terminal $C_T$ of the pulse generating unit 10. As shown in FIG. 1, the capacity of the capacitor 11 is fixed.

Therefore, when power dissipation of the electronic apparatus (not shown) connected with the output terminal Vout is increased, the output voltage of the output terminal Vout is reduced.

While a reduction of the output voltage could be inhibited by an increase of the capacities of the capacitor 33 and the inductor 31, the size of the electronic apparatus equipped with such switching power supply apparatus would also be correspondingly increased. Thus, it would be difficult to adopt such an approach in a portable electronic apparatus.

SUMMARY OF THE INVENTION

To solve the above-indicated problems, it is an object of the present invention to provide a switching power supply apparatus for preventing a reduction of the output voltage of the switching power supply apparatus upon an increase of power dissipation of the electronic apparatus that is provided with power from the switching power supply apparatus.

The foregoing and other objects and advantages are realized by providing a switching power supply apparatus for outputting a variable voltage comprising: a pulse generating unit that sets a frequency of a pulse width modulation signal using capacitance applied to a capacitance input terminal; a switching unit that intermittently connects an input voltage, applied from outside the switching power supply, in response to the pulse width modulation signal; an output unit that smoothes the intermittent voltage from the switching unit, and outputs the same; and a capacitance varying unit that varies the capacitance applied to the pulse generating unit in response to a controlling signal.

The switching unit may also include: a NMOS transistor whose drain terminal is connected to the input voltage, and whose source terminal is connected to an input terminal of the output unit, and whose gate terminal is controlled by a pulse width modulation signal output from the pulse generating unit.

The switching unit may also include: a PMOS (P-channel Metal Oxide Semiconductor) transistor whose source terminal is connected to the input voltage, and whose drain terminal is connected to an input terminal of the output unit, and whose gate terminal is controlled by a pulse width modulation signal output from the pulse generating unit.

The output unit may also include: an inductor connected between an output terminal of the switching unit and an output terminal of the output unit; a diode whose cathode terminal is connected with a node to which an output terminal of the switching unit and an input terminal of the output unit are connected in common and whose anode terminal is grounded; and the first capacitor connected between an output terminal of the output unit and a grounded terminal.

The capacitance varying unit may also include: a second NMOS transistor whose gate terminal is electrically connected with a controlling signal and whose source terminal is connected with an input terminal of the capacitance input terminal; the first capacitor connected between a drain terminal of the second NMOS transistor and a grounded terminal; and the second capacitor connected between a source terminal of the second NMOS transistor and a grounded terminal.

The capacitance varying unit may also include: an NMOS transistor array whose gate terminals receive at least more than two controlling signals from the outside, respectively, and in which more than two NMOS transistors are series-connected between a capacitance input terminal and a grounded terminal; more than one capacitor connected between each source terminal of the NMOS constituting the NMOS transistor array and each grounded terminal; and a diode column oriented in a predetermined direction, connected between gate terminals of the NMOS transistor array.

The capacitance varying unit may also include: a PMOS transistor array whose gate terminals receive at least more than two controlling signals from the outside, respectively, and in which more than two PMOS transistors are series-connected between a capacitance input terminal and a grounded terminal; more than one capacitor connected between each drain terminal of the PMOS constituting the PMOS transistor array and each grounded terminal; and a diode array oriented in a predetermined direction, connected between gate terminals of the PMOS transistor array.

Alternatively, the above-mentioned and other objects and advantages are realized by providing a switching power supply apparatus for outputting a variable voltage comprising: a varactor diode; a pulse generating unit, having a capacitance input terminal for receiving capacitance of the varactor diode and whose duty ratio is set by capacitance of the varactor diode, that generates a pulse width modulation signal according to the set duty ratio; a switching unit that intermittently connects an input voltage, applied from outside the switching power supply, in response to a pulse width modulation signal; an output unit that smoothes the intermittent voltage from the switching unit, and outputs the same; and a varactor diode controlling unit that varies the capacitance of the varactor diode using controlling voltages which respectively correspond to more than one controlling signal.

The switching unit may also include: a NMOS transistor whose drain terminal is connected to the input voltage, and whose source terminal is connected to an input terminal of the output unit, and whose gate terminal is controlled by a pulse width modulation signal output from the pulse generating unit.

The switching unit may also include: a PMOS (P-channel Metal Oxide Semiconductor) transistor whose source terminal is connected to the input voltage, and whose drain terminal is connected to an input terminal of the output unit, and whose gate terminal is controlled by a pulse width modulation signal output from the pulse generating unit.

The output unit may include: an inductor connected between an output terminal of the switching unit and an output terminal of the output unit; a diode whose cathode terminal is connected with a node to which an output terminal of the switching unit and an input terminal of the output unit are connected in common and whose anode terminal is connected to a grounded terminal; and the first capacitor connected between an output terminal of the output unit and a grounded terminal.

The varactor diode controlling unit may include: a lookup table for storing a plurality of controlling signals applied from the outside and output voltage vales corresponding thereto; and a micro computer for receiving a plurality of controlling signals, comparing the same with the controlling signals stored in the lookup table, and outputting a voltage value corresponding to an agreed controlling signal, to the varactor diode.

BRIEF DESCRIPTION OF THE DRAWINGS

The above objects, features and advantages of the invention will become more apparent from the following detailed description of exemplary embodiments thereof, in conjunction with the accompanying drawings, in which.

DETAILED DESCRIPTION OF EXEMPLARY EMBODIMENTS

Exemplary embodiments of the present invention will now be described with reference to the accompanying drawings. The described exemplary embodiments are intended to assist the understanding of the invention, and are not intended to limit the scope of the invention in any way. Additionally, functions or constructions well known to those skilled in the art are not described herein in great detail since such description may obscure the invention with unnecessary detail.

Figure 1:
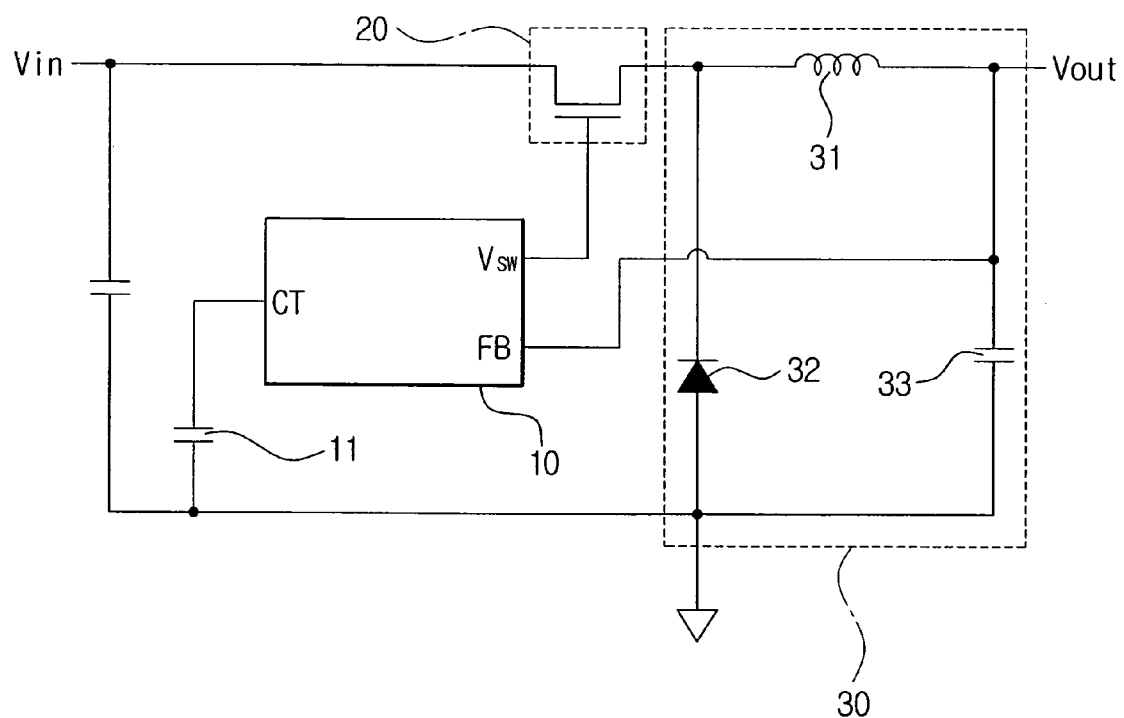
FIG. 1 is a conceptual block diagram of a switching power supply apparatus of a related art.
Figure 2:
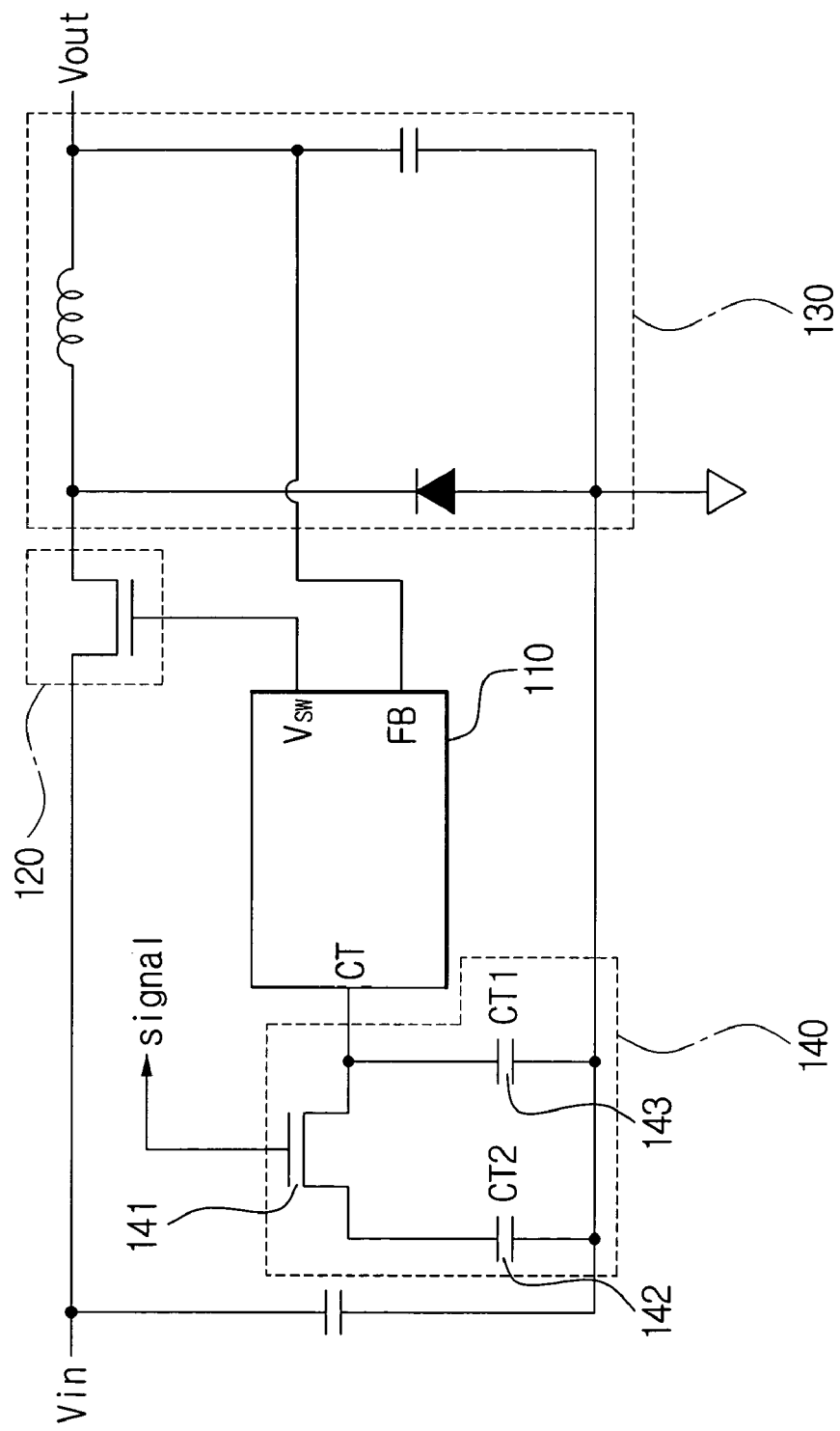
FIG. 2 is a circuit diagram of an embodiment of a switching power supply apparatus according to the invention.

FIG. 2 is a circuit diagram of an exemplary embodiment of a switching power supply apparatus according to the invention. The switching power supply apparatus includes a pulse generating unit 110, a switch 120, an output unit 130, and a capacitance varying unit 140.

The pulse generating unit 110 sets a frequency and a frequency duty ratio using a capacitance of the capacitance varying unit 140 connected with the capacitance input terminal $C_T$, and outputs a pulse width modulation signal according to the set duty ratio.

The switch 120 performs turn on and turn off operations between an input voltage Vin and the output unit 130 in response to a pulse width modulation signal output from the pulse generating unit 110. In this case, the switch 120 could be realized by a NMOS type transistor if the switch 120 is intended to operate in a positive logic region of a pulse width modulation signal output from the pulse generating unit 110. Alternatively, the switch 120 could also be realized by a PMOS type transistor, if the switch 120 is intended to operate in a negative logic region of a pulse width modulation signal.

The output unit 130 smoothes an input voltage Vin that is in a form of a pulse defined by operation of the switch 120, and outputs the same.

The capacitance varying unit 140 is turned on by a signal for predicting a load increase of an electronic apparatus operated by the switching power supply apparatus, and varies the capacitance applied to the capacitance input terminal $C_T$. A variety of signals could be used for predicting the load increase of an electronic apparatus, depending on the type of electronic apparatus connected with the switching power supplying apparatus. For example, when the electronic apparatus connected with the switching power supply apparatus is a mobile phone, a controlling signal generated upon pressing of a 'send' key provided on the mobile phone could be used as a signal for predicting the load increase of the mobile phone. In such a case, before the mobile phone communicates with a base station and actually transmits a voice signal, the capacitance varying unit 140 raises the voltage output from the output unit 130 in advance of such a transmission in response to such controlling signal.

In this exemplary embodiment, the capacitance varying unit 140 includes an NMOS transistor 141, a capacitor 142, and a capacitor 143.

When a controlling signal of 'active high' is not applied, the NMOS transistor 141 is turned off, and the capacitance of only the capacitor 143 is applied to the pulse generating unit 110. Accordingly, the pulse generating unit 110 generates a pulse width modulation signal having a duty ratio set by only the capacitor 143.

In contrast, upon application of a controlling signal from the outside to the NMOS transistor 141, the NMOS transistor 141 is turned on, and the capacitors 142 and 143 are connected in parallel. Accordingly, a sum of the capacitances of the capacitors 142 and 143 is applied to the capacitance input terminal $C_T$ of the pulse generating unit 110, and the pulse generating unit 110 generates a pulse width modulation signal having the duty ratio set by the resultant capacitance formed by both of the capacitors 142 and 143.

As described in the foregoing formula 1, (Vout=(Vin×$t_{on}$)/($t_{on}$+$t_{off}$)), the voltage output from the output unit 130 is set by duty ratio of a pulse output from the pulse generating unit 110, so that capacitance increase due to parallel connection of the capacitors 142 and 143 raises the voltage of the output unit 130 by a predetermined amount.

Figure 3:
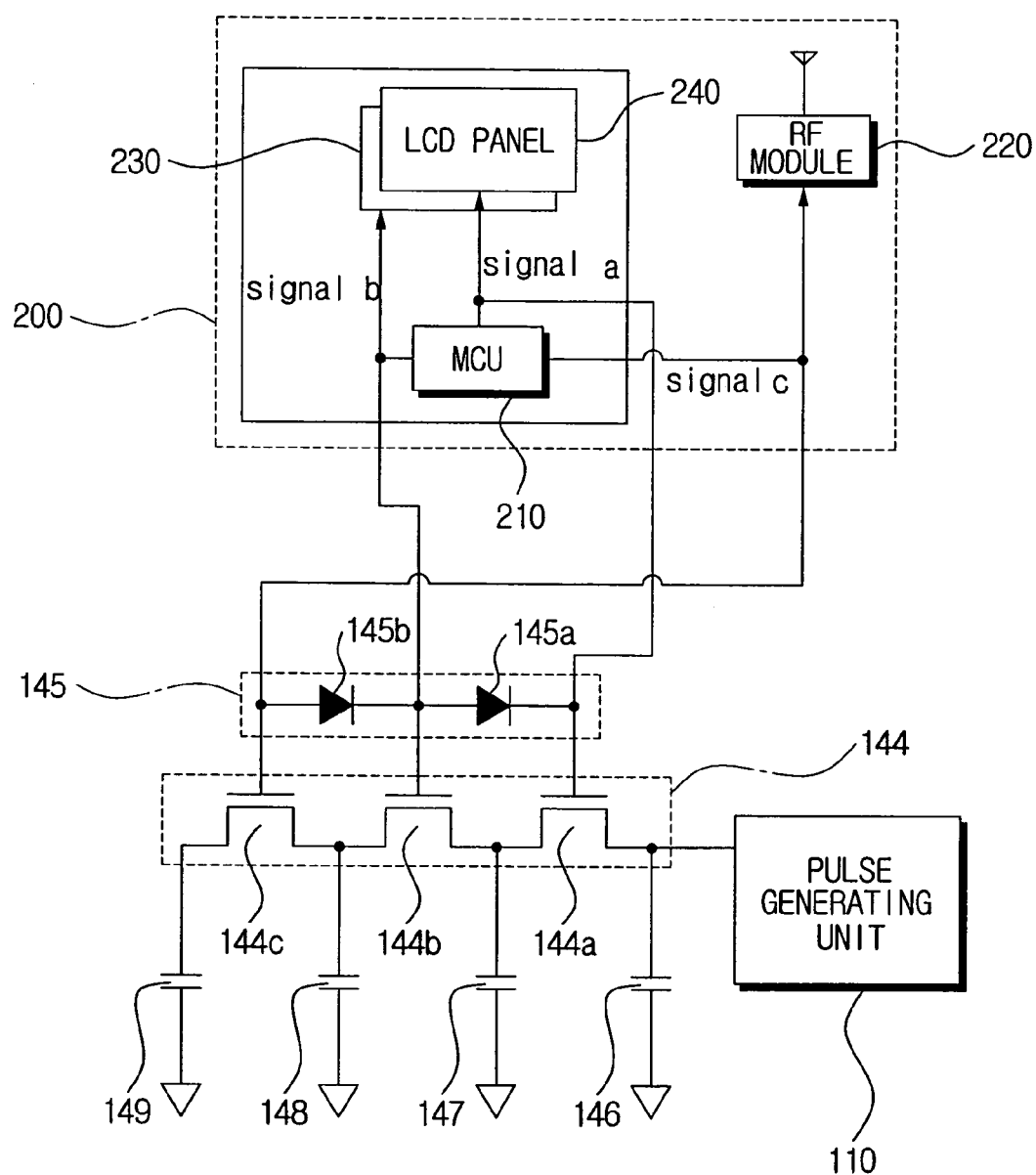
FIG. 3 is a drawing showing another embodiment of a capacitance varying unit of FIG. 2.

FIG. 3 shows another exemplary embodiment of the capacitance varying unit of FIG. 2, illustrating an embodiment where the capacitance varying unit is combined and operated with a mobile phone.

The capacitance varying unit 140 shown in FIG. 3 includes an NMOS transistor array 144, a diode array 145, and capacitors 146, 147, 148, 149.

The gate terminals of NMOS transistors 144a, 144b, 144c making up the NMOS transistor array 144 are connected to receive controlling signals a, b, c, respectively. The controlling signals a, b, c are generated from a mobile phone 200, which is provided with power from the switching power supply apparatus.

The controlling signal 'c' is a signal from a micro computer 210, mounted within the mobile phone, for enabling a RF (Radio Frequency) module 220 for voice and data communication. The controlling signal 'b' is a signal from the micro computer 210 for enabling a back light 230 of a LCD (Liquid Crystal Display) panel 240. The controlling signal 'a' is a signal for enabling the LCD panel 240 to display a character and a picture.

For exemplary ease, it may be presumed that power dissipation of the mobile phone is larger upon voice and data communication through operation of the RF module 220, and that power dissipation is smaller upon operation of the LCD panel 240. Thus, only the capacitance of the capacitors 146 and 147 is applied to the capacitance input terminal $C_T$ of the pulse generating unit 110 upon turn-on of the NMOS transistor 144a due to the controlling signal 'a' generated from the micro computer (Microcontroller unit or MCU) 210, so that duty ratio of a pulse width modulation signal output from the pulse generating unit 110 is smaller. Accordingly, the voltage output from the output unit 130 becomes minimum.

In contrast, a diode 145a is turned on and gate terminals of the NMOS transistor 144a and the NMOS transistor 144b are electrically connected upon turn-on of the NMOS transistor 144b due to the controlling signal 'b' generated from the MCU 210, so that resultant capacitance formed by the capacitor 146, the capacitor 147 and the capacitor 148 is applied to the capacitance input terminal $C_T$ of the pulse generating unit 110. Accordingly, the duty ratio of a pulse width modulation signal output from the pulse generating unit 110 is larger than when the controlling signal 'a' is applied, and the voltage output from the output unit 130 is raised a predetermined amount.

Additionally, a diode 145a and a diode 145b are turned-on, and gate terminals of the NMOS transistors 144a, 144b, 144c are all turned-on upon turn-on of the NMOS transistor 144c due to the controlling signal 'c' generated from the MCU 210, so that the resultant capacitance formed by the capacitor 146, the capacitor 147, the capacitor 148 and the capacitor 149 is applied to the capacitance input terminal $C_T$ of the pulse generating unit 110. Accordingly, the duty ratio of a pulse width modulation signal output from the pulse generating unit 110 is larger than when the controlling signal b is applied, and the voltage output from the output unit 130 becomes a maximum.

Accordingly, it is easy to see that the voltage output from the output unit 130 may be varied between multiple levels depending on the controlling signals a, b, c output from the micro computer 210 mounted within the mobile phone 200.

Figure 4:
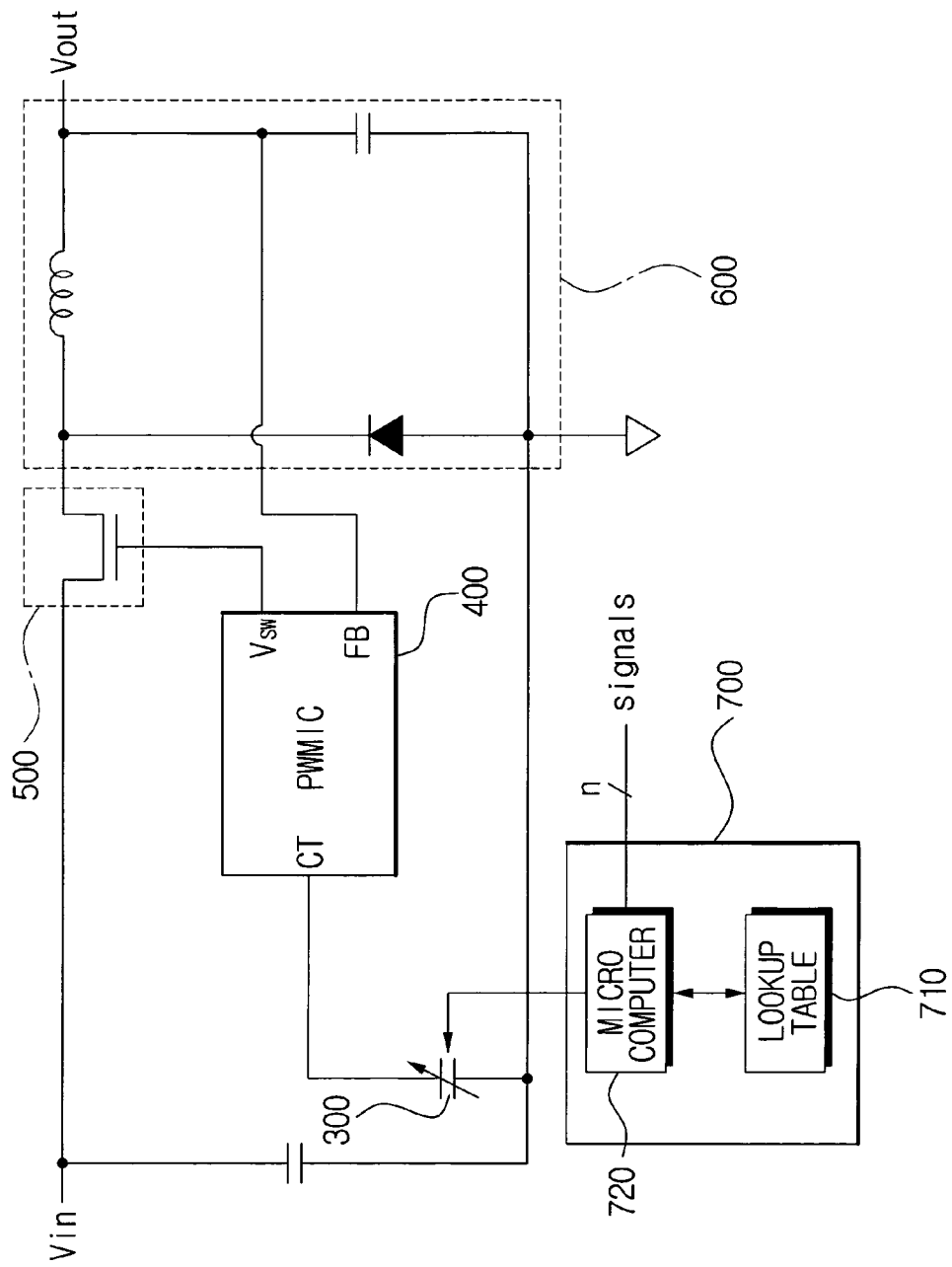
FIG. 4 is a drawing showing another embodiment of a switching power supply apparatus according to the invention.

FIG. 4 is a drawing showing another embodiment of the switching power supply apparatus according to the present invention. The switching power supply apparatus has a varactor diode 300, a pulse generating unit 400, a switching unit 500, an output unit 600, and a varactor diode controlling unit 700.

The varactor diode 300 is an element in which the capacitance may be varied according to a voltage applied from the outside. The present embodiment adopts such a varactor diode 300 for a source of variable capacitance to apply to the pulse generating unit 400.

As operations of the pulse generating unit 400, the switching unit 500, and the output unit 600 have been described in detail in FIG. 2, descriptions thereof will be omitted.

The varactor diode controlling unit 700 stores information regarding a plurality of controlling signals generated from an electronic apparatus (e.g., a mobile phone) connected with the switching power supply apparatus of the present embodiment. The varactor diode controlling unit 700 applies, to the varactor diode 300, a voltage value corresponding to a specific stored controlling signal value upon reception of a controlling signal from the electronic apparatus that matches the specific stored controlling signal.

Accordingly, the capacitance of the varactor diode 300 is varied, and applied to the capacitance input terminal $C_T$ of the pulse generating unit 400 to vary the duty ratio of a pulse width modulation signal Vsw. Depending on the varied duty ratio, the output voltage of the output unit 600 is raised or lowered.

In this embodiment, the varactor diode controlling unit 700 includes a lookup table 710 and a micro computer 720. The lookup table 710 stores specific controlling signal values that correspond to controlling signals output from the electronic apparatus (not shown) provided with power from the switching power supply apparatus, along with the voltage value corresponding to the stored specific controlling signal values.

In this embodiment, the lookup table 710 may be a memory device separately provided from micro computer 720. Alternatively, the lookup table may be an EPROM (Erasable Programmable Read Only Memory), EEPROM (Electronically Erasable Programmable Read Only Memory), mask ROM, or a flash ROM provided to the micro computer 720, at least when the number of the controlling signals to be considered by the switching power supply apparatus is not large.

The micro computer 720 compares the controlling signals applied from the electronic apparatus (not shown) with the controlling signal values stored in the lookup table 710, and applies a voltage value stored in the lookup table 710 to the varactor diode 300 if the applied controlling signal matches with one of the controlling signal values. Therefore, the switching power supply apparatus stabilizes the operation of the electronic apparatus by raising the output voltage before the load of the electronic apparatus (not shown) provided with power from the switching power supply apparatus is increased.

As is apparent from the foregoing description and exemplary embodiments, the invention stabilizes operation of the electronic apparatus by controlling the current increase supplied to the electronic apparatus by receiving in advance the controlling signal for detecting a load increase before the load of the electronic apparatus actually increases. Additionally, the invention does not require a large capacity capacitor or inductor at the output terminal of the switching power supply apparatus in preparation for load increase of the electronic apparatus. Accordingly, the volume of the switching power supply apparatus may be greatly reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A switching power supply apparatus for outputting a variable voltage comprising:
    a pulse generating unit that sets a frequency of a pulse width modulation signal using capacitance applied to a capacitance input terminal;
    a switching unit that intermittently connects an input voltage, applied from outside the switching power supply, in response to the pulse width modulation signal;
    an output unit that smoothes the intermittent voltage from the switching unit, and outputs the same; and
    a capacitance varying unit that varies the capacitance applied to the pulse generating unit in response to a controlling signal.

2. A switching power supply apparatus for outputting a variable voltage as recited in claim 1, wherein the controlling signal is generated outside of the switching power supply apparatus.

3. A switching power supply apparatus for outputting a variable voltage as recited in claim 1, wherein the capacitance varying unit comprises an NMOS transistor, a first capacitor, and a second capacitor.

4. A switching power supply apparatus for outputting a variable voltage as recited in claim 3, wherein, when no controlling signal is applied, the second capacitor is not electrically connected to the pulse generating unit, and the capacitance is provided by the first capacitor.

5. A switching power supply apparatus for outputting a variable voltage as recited in claim 3, wherein, when the controlling signal is applied, the capacitance is set by the first and second capacitors.

6. A switching power supply apparatus for outputting a variable voltage as recited in claim 1, wherein the capacitance varying unit comprises an NMOS transistor array and a capacitor array.

7. A switching power supply apparatus for outputting a variable voltage as recited in claim 1, wherein:
    the NMOS transistor array comprises: a first array NMOS transistor connected to receive a first signal; and a second array NMOS transistor connected to receive a second signal; and
    the capacitor array comprises: a first array capacitor that is directly connected to the pulse generating unit; a second array capacitor that is connected to the pulse generating unit by the first array NMOS transistor; and a third array capacitor that is connected to the pulse generating unit by the second array NMOS transistor.

8. A switching power supply apparatus for outputting a variable voltage as recited in claim 7, wherein when the first signal is received by the first array NMOS transistor, the first array NMOS transistor connects the second array capacitor so that the first and second array capacitors are connected in parallel.

9. A switching power supply apparatus for outputting a variable voltage as recited in claim 7, wherein when the second signal is received by the second array NMOS transistor, the second array NMOS transistor connects the third array capacitor so that the first and third array capacitors are connected in parallel.

10. A switching power supply apparatus for outputting a variable voltage as recited in claim 1, wherein the switching unit comprises an N-channel Metal Oxide Semiconductor transistor comprising:
    a drain terminal connected to the input voltage;
    a source terminal connected to an input terminal of the output unit; and
    a gate terminal controlled by the pulse width modulation signal output from the pulse generating unit.

11. A switching power supply apparatus for outputting a variable voltage as recited in claim 1, wherein the switching unit comprises a P-channel Metal Oxide Semiconductor transistor comprising:
    a source terminal connected to the input voltage;
    a drain terminal connected to an input terminal of the output unit; and
    a gate terminal controlled by the pulse width modulation signal output from the pulse generating unit.

12. A switching power supply apparatus for outputting a variable voltage as recited in claim 1, wherein the output unit comprises:

an inductor connected between an output terminal of the switching unit and an output terminal of the output unit; and a diode comprising a cathode terminal connected with a node to which the output terminal of the switching unit and an input terminal of the output unit are connected in common, and an anode terminal that is grounded;

wherein the first capacitor is connected between the output terminal of the output unit and a grounded terminal.

13. A switching power supply apparatus for outputting a variable voltage as recited in claim 1, wherein the capacitance varying unit comprises:

an NMOS transistor comprising a gate terminal electrically connected to a source of a controlling signal and a source terminal connected to a capacitance input terminal on the pulse generating unit;

a first capacitor connected between a drain terminal of the NMOS transistor and a grounded terminal; and a second capacitor connected between the source terminal of the NMOS transistor and the grounded terminal.

14. A switching power supply apparatus for outputting a variable voltage as recited in claim 1, wherein the capacitance varying unit comprises:

an NMOS transistor array comprising gate terminals electrically arranged to receive a plurality of controlling signals from outside the switching power supply apparatus, wherein at least two of the NMOS transistors are series-connected between a capacitance input terminal on the pulse generating unit and a plurality of grounded terminals;

a plurality of capacitors connected between each source terminal of the NMOS transistors constituting the NMOS transistor array and each grounded terminal; and a diode column oriented in a predetermined direction, connected between gate terminals of the NMOS transistor array.

15. A switching power supply apparatus for outputting a variable voltage as recited in claim 1, wherein the capacitance varying unit comprises:

a PMOS transistor array comprising gate terminals electrically arranged to receive a plurality of controlling signals from the switching power supply apparatus, wherein at least two of the PMOS transistors are series-connected between a capacitance input terminal on the pulse generating unit and a plurality of grounded terminals;

a plurality of capacitors connected between each drain terminal of the PMOS constituting the PMOS transistor array and each grounded terminal; and a diode array oriented in a predetermined direction, connected between gate terminals of the PMOS transistor array.

16. A switching power supply apparatus for outputting a variable voltage comprising:

a varactor diode;

a pulse generating unit, having a capacitance input terminal for receiving capacitance of the varactor diode and whose duty ratio is set by the capacitance of the varactor diode, that generates a pulse width modulation signal according to the set duty ratio;

a switching unit that intermittently connects an input voltage, applied from outside the switching power supply, in response to a pulse width modulation signal;

an output unit that smoothes the intermittent voltage from the switching unit, and outputs the same; and a varactor diode controlling unit that varies the capacitance of the varactor diode using controlling voltages which respectively correspond to more than one controlling signal.

17. A switching power supply apparatus for outputting a variable voltage as recited in claim 16, wherein the controlling signal is generated outside of the switching power supply apparatus.

18. A switching power supply apparatus for outputting a variable voltage as recited in claim 16, wherein the varactor diode controlling unit comprises a microcomputer that receives the controlling signal and outputs the controlling voltages.

19. A switching power supply apparatus for outputting a variable voltage as recited in claim 18, wherein the output controlling voltage corresponds to a stored controlling signal value that is matched to the controlling signal.

20. A switching power supply apparatus for outputting a variable voltage as recited in claim 19, wherein the varactor diode controlling unit comprises a lookup table that stores the controlling signal values.

21. A switching power supply apparatus for outputting a variable voltage as recited in claim 16, wherein the switching unit comprises an N-channel Metal Oxide Semiconductor transistor comprising:

a drain terminal connected to the input voltage;

a source terminal connected to an input terminal of the output unit; and a gate terminal controlled by the pulse width modulation signal output from the pulse generating unit.

22. A switching power supply apparatus for outputting a variable voltage as recited in claim 16, wherein the switching unit comprises a P-channel Metal Oxide Semiconductor transistor comprising:

a source terminal connected to the input voltage;

a drain terminal connected to an input terminal of the output unit; and a gate terminal controlled by the pulse width modulation signal output from the pulse generating unit.

23. A switching power supply apparatus for outputting a variable voltage as recited in claim 16, wherein the output unit comprises:

an inductor connected between an output terminal of the switching unit and an output terminal of the output unit; and a diode comprising a cathode terminal connected with a node to which the output terminal of the switching unit and an input terminal of the output unit are connected in common, and an anode terminal that is grounded;

wherein the first capacitor is connected between the output terminal of the output unit and a grounded terminal.

24. A switching power supply apparatus for outputting a variable voltage as recited in claim 16, wherein the varactor diode controlling unit comprises:

a lookup table that stores a plurality of controlling signal values and output voltage values corresponding thereto; and a micro computer that receives a plurality of controlling signals, compares the controlling signals with the controlling signal values stored in the lookup table, and outputs the voltage value corresponding to the controlling signal value matching the received controlling signal to the varactor diode.

25. A switching power supply apparatus for outputting a variable voltage as recited in claim 20, wherein the lookup table may be one of a memory device, an Erasable Programmable Read Only Memory, an Electronically Erasable Programmable Read Only Memory, a mask ROM, or a flash ROM.

26. A switching power supply apparatus for outputting a variable voltage as recited in claim 24, wherein the lookup table may be one of a memory device, an Erasable Programmable Read Only Memory, an Electronically Erasable Programmable Read Only Memory, a mask ROM, or a flash ROM.

27. A switching power supply apparatus for outputting a variable voltage comprising:
   pulse generating means for setting a frequency of a pulse width modulation signal using capacitance applied to a capacitance input terminal;
   switching means for intermittently connecting an input voltage, applied from outside the switching power supply, in response to the pulse width modulation signal;
   output means for smoothing the intermittent voltage from the switching means, and outputting the same; and
   capacitance varying means for varying the capacitance applied to the pulse generating means in response to a controlling signal.

28. A switching power supply apparatus for outputting a variable voltage comprising:
   a varactor diode;
   pulse generating means for receiving a capacitance of the varactor diode and whose duty ratio is set by capacitance of the varactor diode, and generating a pulse width modulation signal according to the set duty ratio;
   switching means for intermittently connecting an input voltage, applied from outside the switching power supply, in response to the pulse width modulation signal;
   output means for smoothing the intermittent voltage from the switching means, and outputting the same; and
   varactor diode controlling means for varying the capacitance of the varactor diode using controlling voltages which respectively correspond to more than one controlling signal.

* * * * *